UNITED STATES PATENT OFFICE.

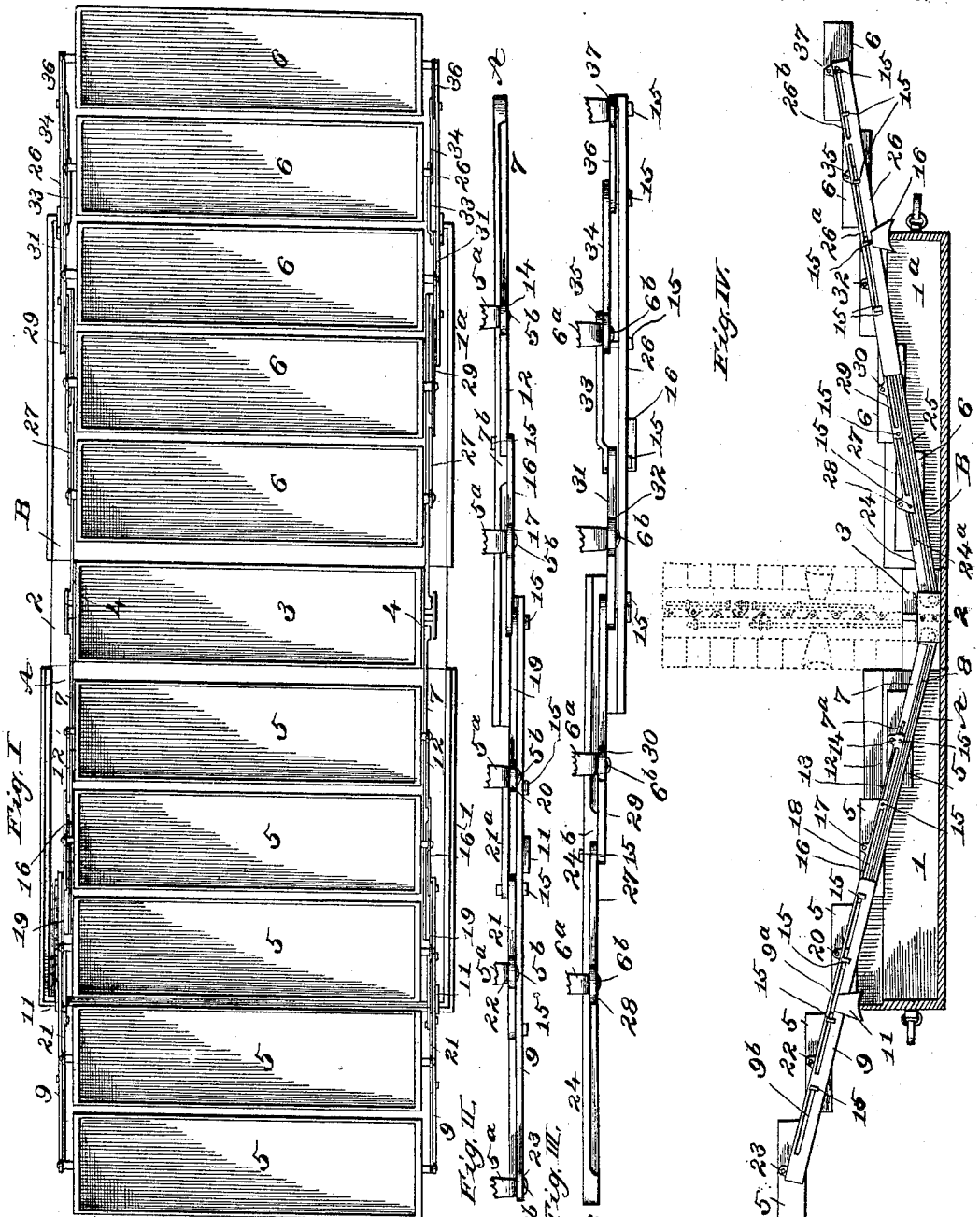

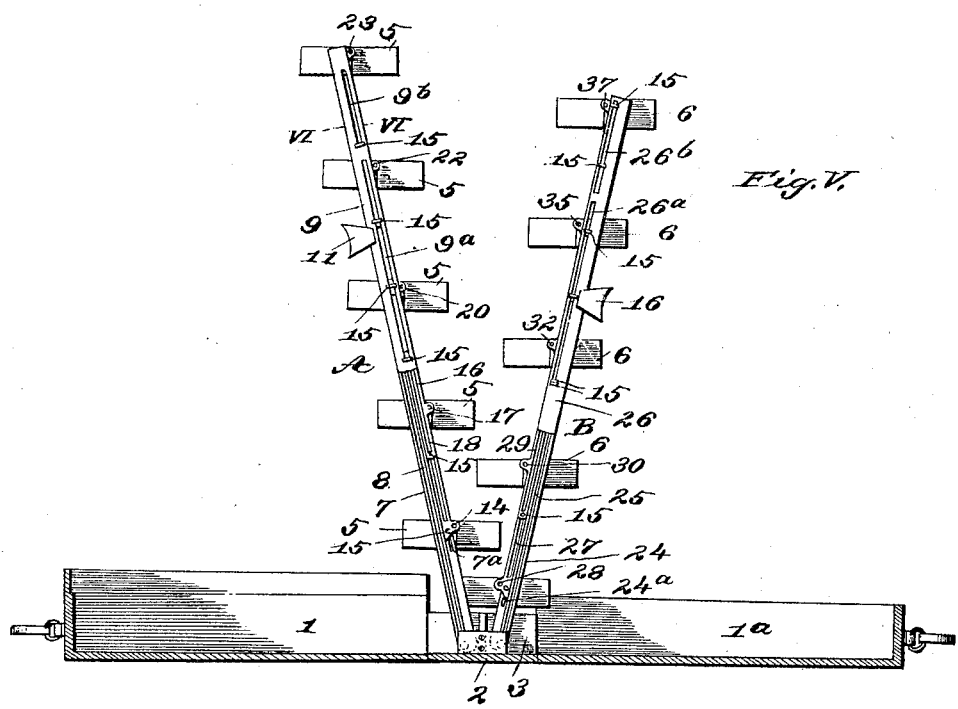

CHRISTIAN J. STRAVLO, OF ST. LOUIS, MISSOURI.

SAMPLE-CASE.

SPECIFICATION forming part of Letters Patent No. 630,129, dated August 1, 1899.

Application filed December 27, 1898. Serial No. 700,361. (No model.)

*To all whom it may concern:*

Be it known that I, CHRISTIAN J. STRAVLO, a citizen of the United States, residing at the city of St. Louis, in the State of Missouri, have invented certain new and useful Improvements in Sample-Cases, of which the following is a full, clear, and exact description, reference being had to the accompanying drawings, forming part of this specification.

My invention relates to that class of sample-cases shown and described in Letters Patent granted to me August 25, 1896, No. 566,484.

The present invention relates to a construction comprising extensible frames in which the sample-trays are pivotally mounted and by means of which construction the trays may be compactly nested into assembled position, so as to utilize the entire space within the outer covers of the case; also, to provide an arrangement whereby trays containing greater space may be utilized and which when disassembled leave their surfaces unobstructed to provide for observation of the entire series of trays.

My invention consists in features of novelty hereinafter fully described, and pointed out in the claims.

Figure I is a top view of the case in open position. Fig. II is an edge view of one of the tray-carrying frames of the pair at one side of the case. Fig. III is a similar view to Fig. II of one of the tray-carrying frames of the pair at the opposite side of the case from that to which the frame shown in Fig. II belongs. Fig. IV is a side elevation of the case in open position with the outer covers shown in cross-section and also showing the trays and their carrying-frames in dotted lines nested. Fig. V is a side elevation showing the outer covers in cross-section and the trays and their carrying-frames in the positions assumed when the two sections are being brought together to nest the trays in folded condition. Fig. VI is a cross-sectional view through one of the tray-carrying frames, taken on line VI VI, Fig. V, and showing a portion of one end of one of the trays in top view. Fig. VII is an enlarged edge view of a portion of one of the tray-carrying frames. Fig. VIII is an enlarged side view of a portion of one of the tray-carrying frames, illustrating the manner in which the links to which the trays are pivoted are connected to the bars of the frame.

1 and $1^a$ designate the outer covers of the case, suitably hinged to a base 2. Rigidly seated on the base is a tray 3, having end walls 4, that are preferably metal bound to insure strength.

A and B designate the pivotal tray-carrying frames, connected to the stationary tray 3, the said frames being in pairs and arranged to swing in counter directions from a central vertical position.

The frames A and B are extensible and contractible, so that their extent may be increased or diminished. The frames A are shown in detail in Fig. II and the frames B are shown in detail in Fig. III. Pivotally mounted in the frames A are trays 5, and pivoted in the frames B are trays 6. The trays 5 are provided with pivot-ears $5^a$, that receive pivot pins or screws $5^b$, and the trays 6 are provided with pivot-ears $6^a$, that receive pivot pins or screws $6^b$.

The frames A are each constructed with an inner bar 7, pivoted to the stationary tray at opposite ends of the tray 3 and provided with undercut grooves 8.

9 are extension-bars bearing tongues 10, that fit and operate in the grooves 8 (see Fig. VI) in the sliding movement of the extension-bars. The extension-bars are adapted to be drawn outwardly into the positions shown in Figs. I to V, inclusive, or contracted into the position shown in dotted lines, Fig. IV. On the extension-bars are legs 11, adapted to rest on the edges of the outer cover 1 when the frame A is extended. The inner bars 7 are provided with longitudinal slots $7^a$. The extension-bars 9 are provided with longitudinal slots $9^a$ and $9^b$.

12 designates slides having longitudinal slots 13 and provided with ears 14, that receive pivot-pins $5^b$, which seat in ears $5^a$ of the adjacent tray 5 to support said tray. The slides 12 are secured to the bars 7 by pins 15, extending through the slots $7^a$, the said pins having elongated heads adapted to lie crosswise of said slots to hold the slides to the bars, but which are capable of being turned, so that the length of the heads lie parallel with the length of the slots and may pass therethrough in attaching the slides to the bars or in detaching them. The form of these pins is shown most clearly in Figs. VI and VIII, and a number of them are used throughout the frames, which will be referred to by like designation. The movement of the slides 12 in outward direction is limited by stops 7$^b$ on the faces of the bars 7.

16 designates slides connected to the slides 12 by pivot-pins 15, passing through the inner ends of said slides 16 and through the slots 13 of the slides 12 and also through the slots 7$^a$ of the bars 7. The slides 16 are provided with ears 17, that receive tray-supporting pivot-pins 5$^b$, and each slide 16 is provided with a longitudinal slot 18. The outer ends of the slides 16 contain slide-pins 15, seated in the slots 9$^a$ of the extension-bars 9. The slide-pins 15 in the outer ends of the slides 16 also pass through slotted slides 19, located at the inner faces of the extension-bars 9. The slides 19 are provided with ears 20, that receive tray-supporting pivot-pins 5$^b$.

21 designates slides having pivot-pin-receiving ears 22, these slides 21 being connected to the slides 19 by slotted links 21$^a$, that connect with the slides 19 and 21 by slide-pins 15. The outer ends of the slides 21 are provided with slide-pins 15, that fit and operate in the slots 9$^b$, located near the outer ends of the extension-bars 9. The tray 5, mounted at the outermost ends of the extension-bars 9, is pivotally mounted on pivot pins or screws 5$^b$, that are seated in ears 23, rigid with the extension-bars 9, so that the outermost tray 5 (which is the topmost tray when the trays of both sections are nested together) is only movable in connection with the extension-bars.

Referring now to the opposite side of the case equipped with the tray-carrying frames B, the frames B are composed of inner bars 24 and extension-bars 26, similar to those 7 and 9 of the frames A. The inner bars 24 are provided with longitudinal grooves 25, and the extension-bars 26 are provided with tongues similar to those 8 that operate in said grooves 25. The inner bars 24 are provided with longitudinal slots 24$^a$, and the extension-bars 26 are provided with longitudinal slots 26$^a$ and 26$^b$, the slots 26$^b$ extending to approximately the ends of the extension-bars.

27 designates slotted slides movably connected to the inner bars 24 by pivot-pins 15, extending through the slots 24$^a$, contained by said inner bars. Each slide 27 is provided with an ear 28, that receives pivot pins or screws 6$^b$, that enter the ears 6$^a$, carried by the trays 6. The outward movement of the slides 27 is limited by stops 24$^b$ on the faces of the inner bars 24.

29 designates slotted slides connected to the outer ends of the slides 27 by slide-pins carried by the inner ends of said slides 29 and passing through the slots in the slides 27 and through the slots in the bars 24. The slides 29 are provided with ears 30, that receive tray-supporting pivot-pins 6$^b$. The outer ends of the slides 29 contain slide-pins 15, that pass through the inner ends of slotted slides 31 and also through the slots 26$^a$ in the extension-bars 26 to the exterior thereof. The slides 31 are provided with pivot-pin-receiving ears 32 and are connected by slotted links 33 to slides 34, provided with pivot-pin-receiving ears 35, which slides 34 are connected by slide-pins 15 to slides 36, having pivot-pin-receiving ears 37. The two outermost slide-pins 15, which pass through the slides 36, are located in the slots 26$^b$, so that the outermost tray 6 is capable of being moved inwardly from the extreme outer ends of the extension-bars 26, thereby leaving a space between the outer ends of said extension-bars when the trays are in nested or folded condition, into which space the outermost tray 5 at the opposite side of the case is received on the assembling of the trays into the nested condition shown by dotted lines, Fig. IV. The frames B are provided with legs 11$^a$, carried by the extension-bars 26, similar to those 11, carried by the frame A, which are adapted to rest on the cover 1$^a$ when the frame B is extended.

A portion of the slide-pins 15 in each of the frames A and B are loosely seated in the slides which they connect, so that they may be turned to bring their elongated heads into line with the length of the slots in the frame-bars to be capable of passing therethrough without removing them from their connections. This arrangement is provided for the purpose of permitting the disconnection of the slides from the frame-bars in the event of any of the links becoming broken. In Fig. VIII, I have illustrated the manner in which such disconnection is accomplished. When the slide-pin shown is removed from the bar-contained slot in said figure, it will be seen that the opposite ends of the connected slides may be brought toward each other, and the slide-pins at said opposite ends will be turned to bring their elongated heads into line with the slots in the frame-bars to pass therethrough.

In assembling the trays into nested condition each section is moved upwardly and inwardly from the extended positions shown in Figs. I and IV into the positions shown in Fig. V while the frames A and B are still extended, in which condition it will be seen that the trays of the opposing sections are offset from those of the other section, so that the alternate trays of the sections may enter above or below trays opposing them. The frames being brought together, the trays 5 and 6 lie in a tier, but separated by spaces between them above and below each tray. The extension-bars 9 and 26 are then pressed downward to contract the frames A and B, causing the slides throughout said frames to be moved inwardly and the trays carried by said slides to be lowered into compact condition, each succeeding tray descending onto the one beneath it. The lowermost tray 6 rests on the stationary tray 3 and the topmost tray 5 moves down onto the topmost tray 6, and therefore is the topmost tray of the tier when the sections are nested.

I claim as my invention—

1. In a sample-case, the combination of an outer case, two pairs of extensible frames hinged to said outer case, movable slides carried by said frames, and trays pivotally mounted in said slide; substantially as described.

2. In a sample-case, the combination of an outer case, comprising a base and covers hinged to said base; two pairs of extensible frames hinged to said outer case, movable slides carried by said frames, and trays pivotally mounted in said slides; substantially as described.

3. In a sample-case, the combination of an outer case, comprising a base and covers hinged to said base; a stationary tray carried by said base, two pairs of extensible frames hinged to said stationary trays, movable slides carried by said frames, said slides being connected to each other and the said frames, whereby movement imparted to said frames may be communicated to said slides to move them in unison with the frames, and trays pivotally mounted in said slides; substantially as described.

4. In a sample-case, the combination of an outer case comprising a base and covers hinged to said base, a stationary tray carried by said base, two pairs of extensible frames hinged to said tray, slides movably attached to the bars of said frames, and trays pivotally connected to said slides, substantially as described.

CHRISTIAN J. STRAVLO.

In presence of—
 E. S. KNIGHT,
 STANLEY STONER.